(12) United States Patent
Enyedy et al.

(10) Patent No.: US 8,878,097 B2
(45) Date of Patent: Nov. 4, 2014

(54) WIRE FEEDER WITH CURVED FORCE GENERATING ELEMENT(S) FOR BETTER POSITIONING OF AN ADJUSTING MECHANISM

(75) Inventors: Edward A. Enyedy, Eastlake, OH (US); Larry Boehnlein, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1691 days.

(21) Appl. No.: 12/193,073

(22) Filed: Aug. 18, 2008

(65) Prior Publication Data
US 2010/0038350 A1 Feb. 18, 2010

(51) Int. Cl.
B23K 9/12 (2006.01)
B65H 20/00 (2006.01)
F16F 3/00 (2006.01)
B23K 9/133 (2006.01)

(52) U.S. Cl.
CPC ................................ *B23K 9/1336* (2013.01)
USPC .................................... 219/137.2; 219/137.7

(58) Field of Classification Search
USPC .............. 219/137.2, 137.7; 226/90, 176, 177, 226/181, 187, 189
See application file for complete search history.

(56) References Cited

U.S. PATENT DOCUMENTS

| | | |
|---|---|---|
| 1,640,368 A | 8/1927 | Obetz et al. |
| 2,271,723 A | 2/1942 | Trainer |
| 2,286,140 A | 6/1942 | Klein et al. |
| 2,525,590 A | 10/1950 | Collins |
| 2,603,343 A | 7/1952 | Payne |
| 2,724,538 A | 11/1955 | Schweich |
| 2,754,958 A | 7/1956 | Murrell et al. |
| 2,767,302 A | 10/1956 | Brashear, Jr. |
| 2,778,910 A | 1/1957 | Landis et al. |
| 2,786,674 A | 3/1957 | Heijnis et al. |
| 2,906,913 A | 9/1959 | Catlett |
| 2,929,496 A | 3/1960 | Muehlebach et al. |
| 2,974,850 A | 3/1961 | Mayer |

(Continued)

FOREIGN PATENT DOCUMENTS

| | | |
|---|---|---|
| DE | 19943024 A1 | 4/2001 |
| EP | 1057751 | 12/2000 |

(Continued)

OTHER PUBLICATIONS

Miller Electric Mgf. Co., S-52A Owner's Manual, Oct. 1991, 44 pgs. USA.

(Continued)

*Primary Examiner* — Brian Jennison
(74) *Attorney, Agent, or Firm* — Hahn Loeser & Parks LLP; Shannon V. McCue

(57) ABSTRACT

An apparatus for feeding a wire. The apparatus includes at least one pair of rotatable rollers and at least one curved or curvable force-generating element. The at least one curved or curvable force-generating element is capable of applying a force via a proximal end of the at least one curved or curvable force-generating element to displace a first roller of the at least one pair of rotatable rollers towards a second roller of the at least one pair of the rotatable rollers to engage a wire there between. The apparatus further includes an adjustment mechanism operationally connected at a distal end of the at least one curved or curvable force-generating element to allow adjustment of the applied force.

7 Claims, 12 Drawing Sheets

(56) References Cited

U.S. PATENT DOCUMENTS

| | | | |
|---|---|---|---|
| 3,016,451 | A | 1/1962 | Cornell, Jr. |
| 3,052,393 | A | 9/1962 | McKenzie |
| 3,207,401 | A | 9/1965 | Everett |
| 3,217,136 | A | 11/1965 | Anderson |
| 3,239,120 | A | 3/1966 | Bosteels |
| 3,244,347 | A | 4/1966 | Jenk |
| 3,263,060 | A | 7/1966 | Bosteels |
| 3,401,859 | A | 9/1968 | Rienks et al. |
| 3,430,832 | A | 3/1969 | Meyer |
| 3,491,876 | A | 1/1970 | Zecchin |
| 3,553,423 | A | 1/1971 | Doxey |
| 3,562,577 | A | 2/1971 | Kensrue |
| 3,644,701 | A | 2/1972 | Kobayashi et al. |
| 3,694,620 | A | 9/1972 | Gleason |
| 3,722,772 | A | 3/1973 | Flowers et al. |
| 3,730,136 | A | 5/1973 | Okada |
| 3,883,061 | A | 5/1975 | Thor |
| 3,898,419 | A | 8/1975 | Smith |
| 4,098,445 | A | 7/1978 | Samokovliski et al. |
| 4,150,772 | A | 4/1979 | Auer |
| 4,205,771 | A | 6/1980 | Samokovliski et al. |
| 4,235,362 | A * | 11/1980 | Hubenko ............... 226/181 |
| 4,247,751 | A | 1/1981 | Ashton et al. |
| 4,261,499 | A | 4/1981 | Samokovliski et al. |
| 4,268,248 | A | 5/1981 | Wilbur et al. |
| 4,277,011 | A | 7/1981 | Jeter |
| 4,354,626 | A | 10/1982 | Brandewie et al. |
| 4,426,046 | A | 1/1984 | Heuckroth |
| 4,508,954 | A | 4/1985 | Kroll |
| 4,532,406 | A | 7/1985 | Povlick et al. |
| 4,582,198 | A | 4/1986 | Ditton |
| 4,623,063 | A | 11/1986 | Balkin |
| 4,659,904 | A | 4/1987 | Greineder |
| 4,665,300 | A | 5/1987 | Bellefleur |
| 4,731,518 | A | 3/1988 | Parmelee et al. |
| 4,842,669 | A | 6/1989 | Considine |
| 4,869,367 | A | 9/1989 | Kawasaki et al. |
| 4,889,271 | A | 12/1989 | Kurokawa |
| 5,053,591 | A | 10/1991 | Theurer |
| 5,053,598 | A | 10/1991 | Sakai et al. |
| 5,060,882 | A | 10/1991 | Rousculp et al. |
| 5,072,872 | A | 12/1991 | Casset et al. |
| 5,078,269 | A | 1/1992 | Dekko et al. |
| 5,090,647 | A | 2/1992 | Clarke |
| 5,109,983 | A | 5/1992 | Malone et al. |
| 5,155,330 | A | 10/1992 | Fratiello et al. |
| 5,205,412 | A | 4/1993 | Krieg |
| 5,277,314 | A | 1/1994 | Cooper et al. |
| 5,309,603 | A | 5/1994 | Oexler et al. |
| 5,369,243 | A | 11/1994 | Kramer et al. |
| 5,410,126 | A | 4/1995 | Miller et al. |
| 5,489,056 | A | 2/1996 | Staschewski |
| 5,494,160 | A | 2/1996 | Gelmetti |
| 5,497,928 | A | 3/1996 | Burns et al. |
| 5,521,355 | A | 5/1996 | Lorentzen |
| 5,584,648 | A | 12/1996 | Camelli et al. |
| 5,622,637 | A | 4/1997 | Taiana |
| 5,775,619 | A | 7/1998 | Tabellini |
| 5,779,126 | A * | 7/1998 | Chun ............... 226/187 |
| 5,816,466 | A | 10/1998 | Seufer |
| 5,819,934 | A | 10/1998 | Cooper |
| 5,836,539 | A | 11/1998 | Grimm et al. |
| 5,845,862 | A | 12/1998 | Cipriani |
| 5,951,885 | A | 9/1999 | Takahashi et al. |
| 5,970,851 | A * | 10/1999 | Masel et al. ............... 99/334 |
| 5,973,291 | A | 10/1999 | Kramer et al. |
| 5,981,906 | A | 11/1999 | Parker |
| 6,213,375 | B1 | 4/2001 | Rybicki |
| 6,225,596 | B1 | 5/2001 | Chandler et al. |
| 6,228,213 | B1 | 5/2001 | Hanna et al. |
| 6,267,291 | B1 | 7/2001 | Blankenship et al. |
| 6,427,894 | B1 | 8/2002 | Blank et al. |
| 6,557,742 | B1 | 5/2003 | Bobeczko et al. |
| 6,561,528 | B2 | 5/2003 | Bootsman |
| 6,568,578 | B1 | 5/2003 | Kensrue |
| 6,596,970 | B2 | 7/2003 | Blankenship et al. |
| 6,596,972 | B2 | 7/2003 | Di Novo et al. |
| 6,627,848 | B2 | 9/2003 | Boehnlein |
| 6,892,810 | B2 | 5/2005 | Austbo et al. |
| 7,026,574 | B2 | 4/2006 | Belfiore et al. |
| 7,176,411 | B2 | 2/2007 | Enyedy |
| 2004/0188100 | A1 | 9/2004 | Austbo et al. |
| 2005/0224482 | A1 | 10/2005 | Matiash |
| 2005/0224484 | A1 | 10/2005 | Matiash |
| 2005/0224485 | A1 | 10/2005 | Matiash et al. |
| 2005/0224486 | A1 | 10/2005 | Matiash |
| 2005/0224488 | A1 | 10/2005 | Matiash |
| 2005/0224489 | A1 | 10/2005 | Matiash |
| 2005/0224550 | A1 | 10/2005 | Matiash |
| 2006/0070984 | A1 | 4/2006 | Barton et al. |
| 2006/0138114 | A1* | 6/2006 | Belfiore et al. ............ 219/137.2 |
| 2008/0035626 | A1 | 2/2008 | Christopher et al. |

FOREIGN PATENT DOCUMENTS

| | | |
|---|---|---|
| FR | 2265489 A1 | 10/1975 |
| JP | 62-111872 | 5/1987 |
| WO | 88/10230 | 12/1988 |
| WO | 94/19258 | 9/1994 |
| WO | 2005/099953 | 10/2005 |

OTHER PUBLICATIONS

PCT/IB2009/006357 International Search Report.
PCT/IB2009/006357 Written Opinion.

* cited by examiner

# WIRE FEEDER WITH CURVED FORCE GENERATING ELEMENT(S) FOR BETTER POSITIONING OF AN ADJUSTING MECHANISM

CROSS-REFERENCE TO RELATED APPLICATIONS/INCORPORATION BY REFERENCE

Embodiments of the present invention relate to wire feeders which feed wire to a welding operation wherein the welding wire must be fed in a controlled manner without tangling or interruption. Wire feeders are known in the art and are generally shown and described in Seufer U.S. Pat. No. 5,816,466 which is hereby incorporated by reference herein as background information illustrating the general structure of a wire feeder including two sets of pinch rollers. Sakai U.S. Pat. No. 5,053,598 is incorporated herein as background information and illustrates the application of force on the welding wire by the pinch rollers to grip the wire. Hubenko U.S. Pat. No. 4,235,362; Gleason U.S. Pat. No. 3,694,620; and Okada U.S. Pat. No. 3,730,136 are also incorporated by reference herein as background information further illustrating wire feeding devices. Furthermore, U.S. patent application Ser. No. 11/358,896 and U.S. patent application Ser. No. 11/621,782 are both incorporated herein by reference in their entirety.

TECHNICAL FIELD

The claimed invention relates to the art of dispensing wire and, more particularly, to a wire gripper used in a drive unit of a wire feeder for controlling the force which is applied by the pinch rollers against the wire driven by the wire feeder.

BACKGROUND

It is well known that using a welding wire as a consumable electrode in the welding process may enhance the weld. An important aspect of using a consumable welding wire is maintaining a consistent and reliable flow of wire to the welding operation. As can be appreciated, interruptions in the flow of the welding wire may stop the welding process, thereby reducing its efficiency.

Wire drives for feeding welding wire typically have one or two pairs of rollers. Each pair of rollers squeezes on the wire to pull the wire from a wire package or spool and push the wire through a welding gun. Using two pairs of rollers provides more traction.

Known existing art wire feeders use spring elements that are arranged in a linear manner. Many existing art wire feeders use a compression spring. The spring may act directly on the idle arms or may push upon a cam that exerts force on the idle arms. The adjustment mechanisms for adjusting the application force provided by the linear spring elements are not positioned in the most convenient location for a user to access, however.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

The claimed invention is particularly applicable for use in connection with welding wire feeders and, therefore, embodiments of the present invention will be described with particular reference to wire feeders used in connection with a welding operation. However, the claimed invention has broader applications and may be used with other types of wire or other wire-like materials.

An embodiment of the present invention comprises a first apparatus for feeding a wire. The apparatus includes at least one pair of rotatable rollers and at least one curved or curvable force-generating element capable of applying a force via a proximal end of the at least one curved or curvable force-generating element to displace a first roller of the at least one pair of the rotatable rollers towards a second roller of the at least one pair of the rotatable rollers to engage a wire there between. The apparatus also includes an adjustment mechanism operationally connected at a distal end of the at least one curved or curvable force-generating element to allow adjustment of the applied force.

These and other features of the claimed invention, as well as details of illustrated embodiments thereof, will be more fully understood from the following description and drawings.

DETAILED DESCRIPTION

Figure 1:
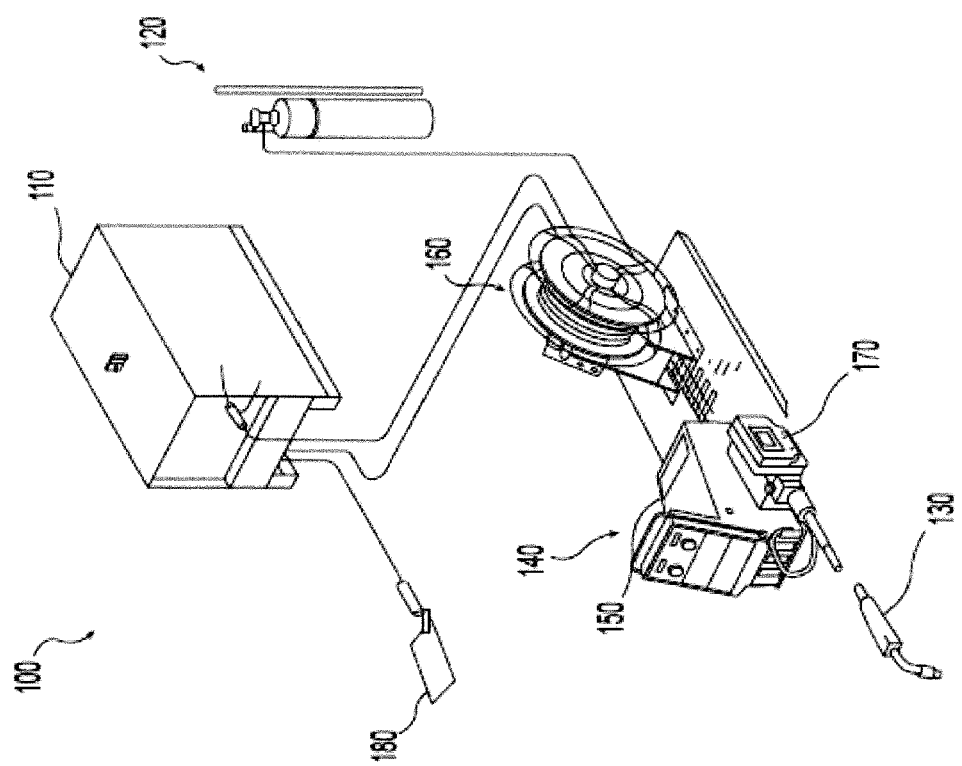
FIG. 1 illustrates an exemplary embodiment of an arc welding system having a wire feeder.

FIG. 1 illustrates an exemplary embodiment of an arc welding system 100 having a wire feeder 140. The system 100 includes a welding power source 110, the welding wire feeder 140, a welding wire source 160, a gas source 120, and a welding gun 130. The wire feeder 140 includes a controller 150 and a wire gripping device 170. The controller 150 may include a motor (not shown) that drives the wire gripping device 170 to pull a welding wire electrode from the welding wire source 160 through the wire gripping device 170 and into the welding gun 130. Such welding systems are well known in the art. A first electrical terminal of the welding power source 110 may be connected to a work piece 180 such that the welding wire electrode, which is electrically connected to a second electrical terminal of the welding power source, may be applied to the work piece 180 via the welding gun 130 to produce a weld in an arc welding operation. Embodiments of the present invention are concerned with improvements to the wire gripping device 170.

Figure 2:
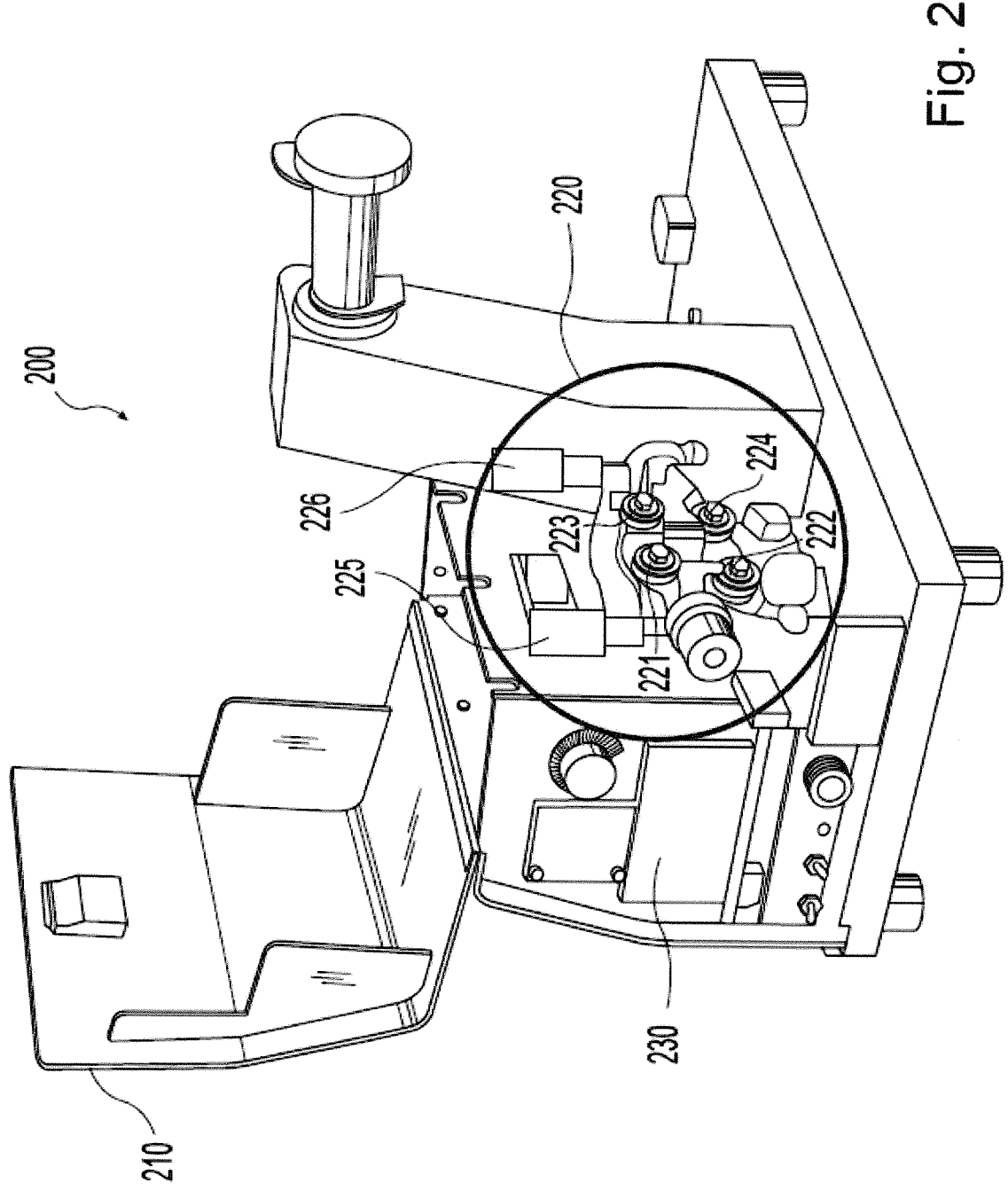
FIG. 2 illustrates a first exemplary embodiment of a wire feeder that may be used in the arc welding system of FIG. 1.

FIG. 2 illustrates a first exemplary embodiment of a wire feeder 200 that may be used in the arc welding system 100 of FIG. 1. A cover 210 of the wire feeder 200 is opened to show a wire gripping device 220 (encircled). The wire feeder 200 also includes a controller 230 which may be similar to the controller 150 of FIG. 1, for example. The wire gripping device 220 includes a first pair or rotatable rollers 221 and 222, and a second pair of rotatable rollers 223 and 224. Each pair is capable of gripping a welding wire there between and rotating to feed the welding wire from a welding wire source 160 to a welding gun 130. The wire gripping device 220 includes a force generating portion having two straight or linear adjustable force generating mechanisms (force generators) 225 and 226 (e.g., springs and adjustment elements) to adjust the gripping force between each pair of rollers, respectively.

Figure 3:
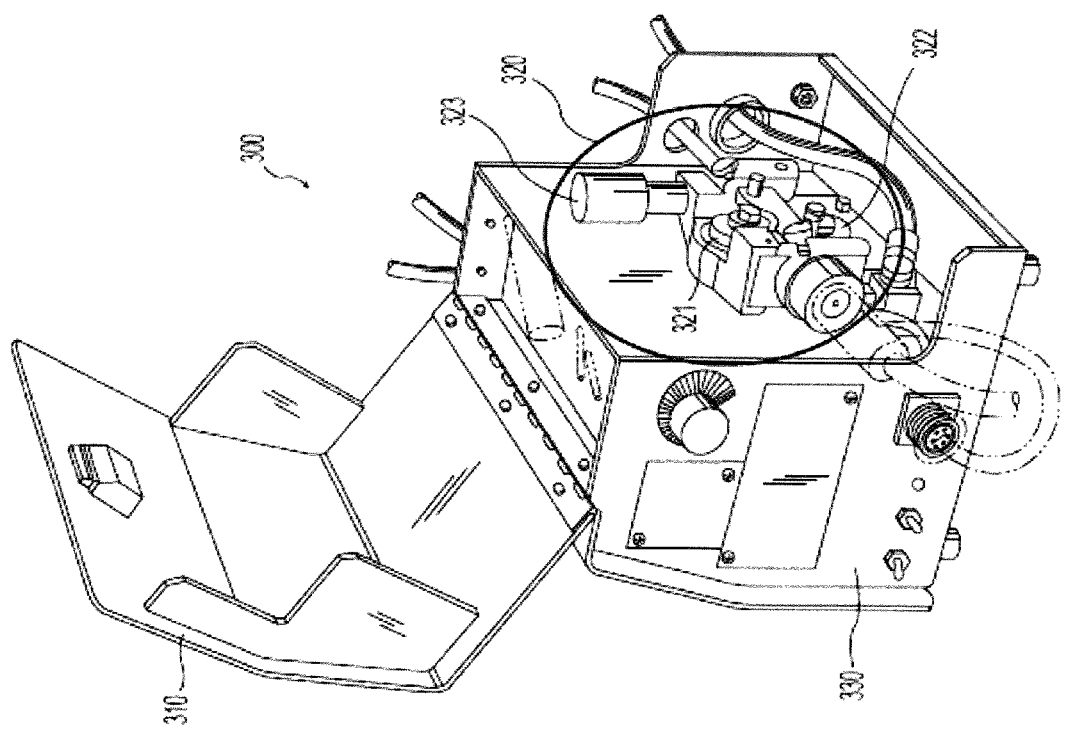
FIG. 3 illustrates a second exemplary embodiment of a wire feeder that may be used in the arc welding system of FIG. 1.

Similarly, FIG. 3 illustrates a second exemplary embodiment of a wire feeder 300 that may be used in the arc welding system 100 of FIG. 1. A cover 310 of the wire feeder 300 is opened to show a wire gripping device 320 (encircled). The wire feeder 300 also includes a controller 330 which may be similar to the controller 150 of FIG. 1 or 230 of FIG. 2 for example. The wire gripping device includes a single pair of rotatable rollers 321 and 322. The pair is capable of gripping a welding wire there between and rotating to feed the welding wire from a welding wire source 160 to a welding gun 130. The wire gripping device 320 includes a force generating portion having a single straight or linear adjustable force generating mechanism 323 (e.g., a compression spring and an adjustment element) to adjust the gripping force between the rollers. Such straight or linear adjustable force generating mechanisms (force generators) as shown in FIG. 2 and FIG. 3 tend to limit the resultant location and user access to the corresponding adjustment element.

Figure 4:
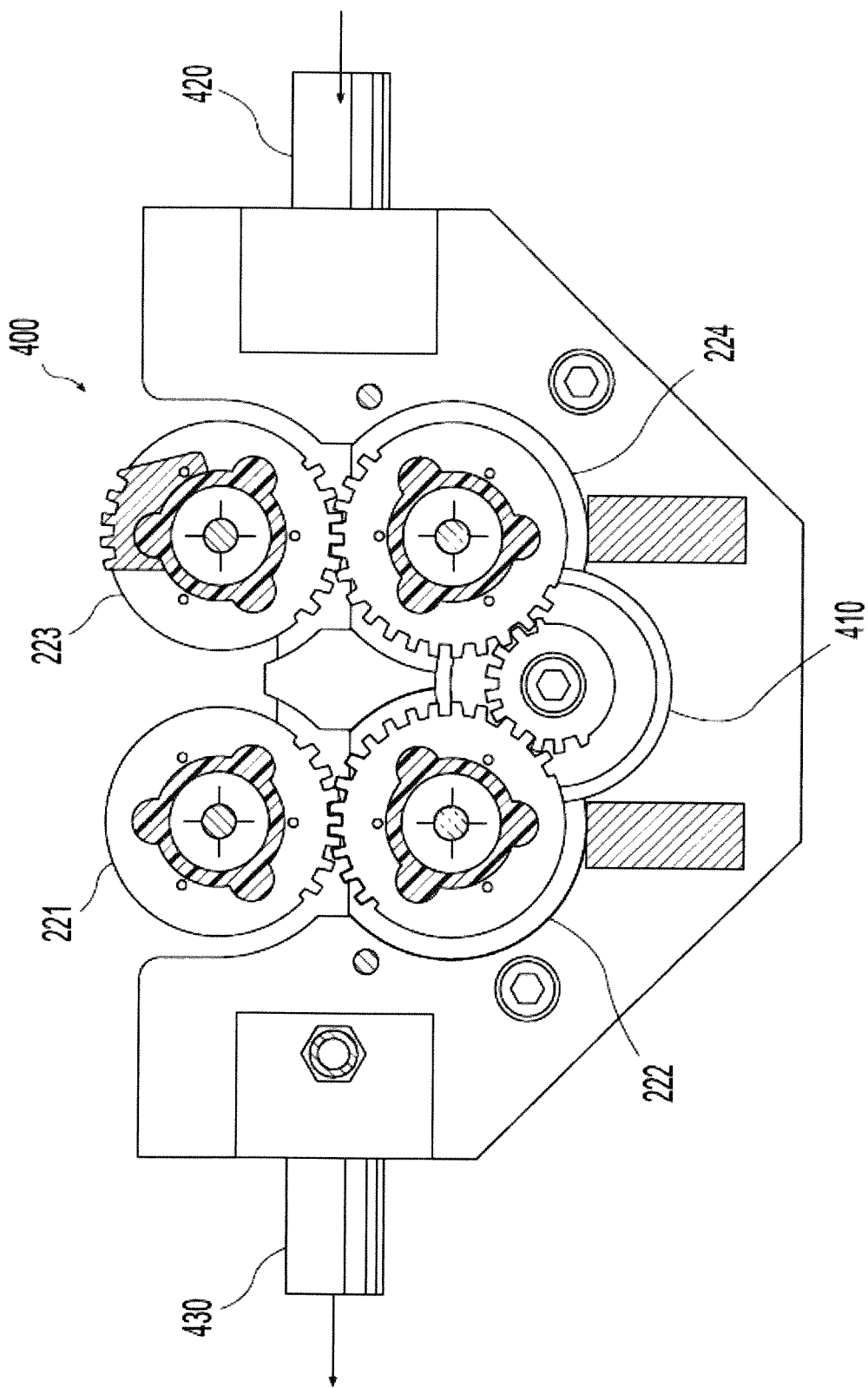
FIG. 4 illustrates an exemplary embodiment of a portion of a wire gripper that may be used in the wire feeder of FIG. 2.

FIG. 4 illustrates an exemplary embodiment of a gripping portion 400 of the wire gripping device 220 that may be used in the wire feeder 200 of FIG. 2. The gripping portion 400 includes the first pair of rotatable rollers 221 and 222 and the second pair of rotatable rollers 223 and 224 as described for FIG. 2. The gripping portion 400 further includes a rotatable gear element 410 which may be operationally connected to a motor in the controller 230 via a gear box in order to drive the rollers. Other drive mechanism could be used without detracting from the scope of the claimed invention. During operation, the welding wire electrode is fed into a first wire port 420 from a welding wire source (e.g., 160) and exits at a second wire port 430 leading into a welding gun (e.g., 130).

Figure 5:
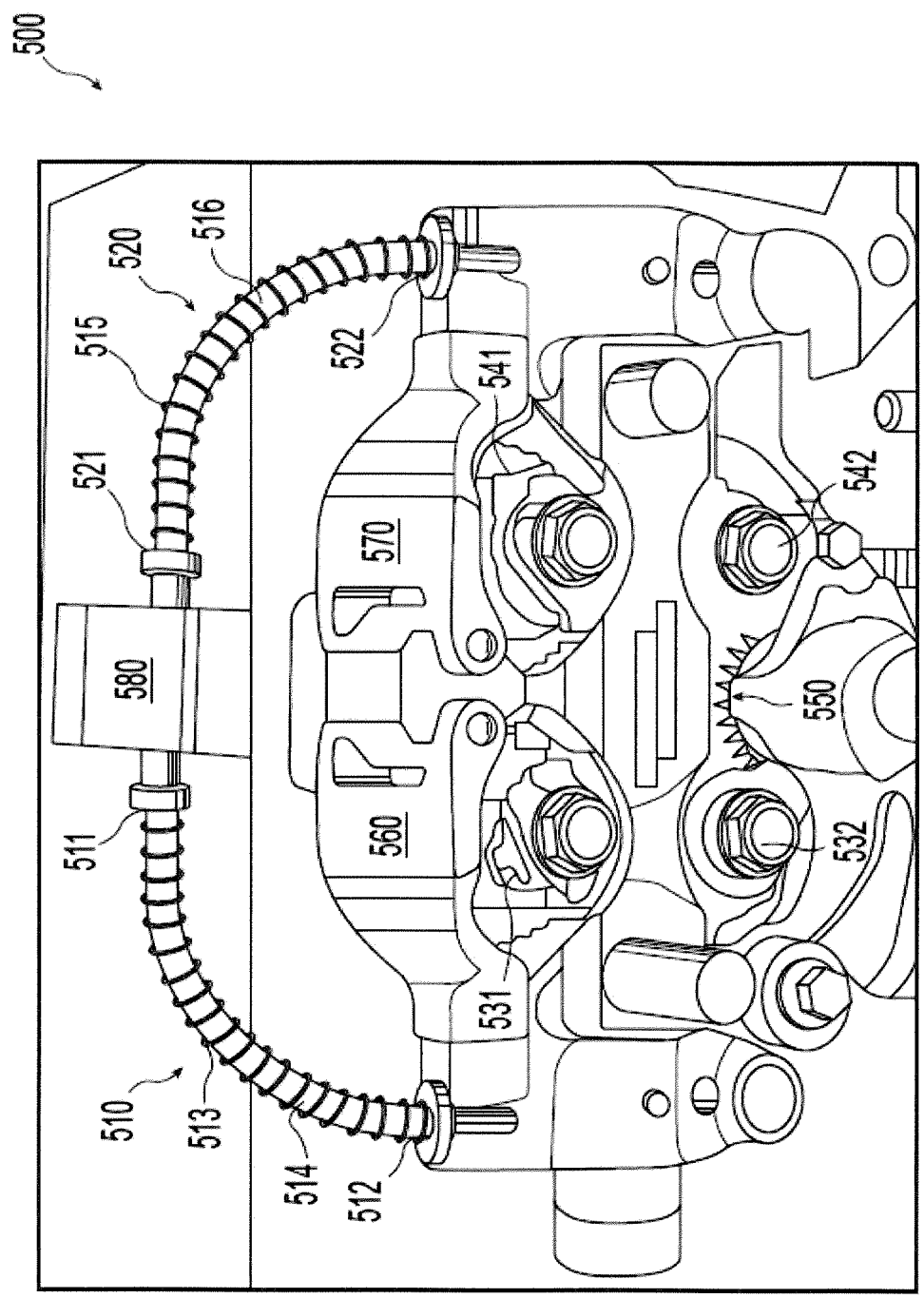
FIG. 5 illustrates an exemplary embodiment of an apparatus for feeding a wire, having two curved spring-type mechanisms, that may be used in a wire feeder.

FIG. 5 illustrates an exemplary embodiment of an apparatus 500 (i.e., a wire gripping device 500) for feeding a welding wire electrode, having an improved force generating portion including two curved spring-type mechanisms 510 and 520, that may be used in a wire feeder (e.g., 140, 200, or 300). The wire gripping device 500 includes a first pair of rotatable rollers 531 and 532 and a second pair of rotatable rollers 541 and 542 similar to those in FIG. 4. The rotatable rollers are driven by a gear 550 similar to the gear 410 in FIG. 4. In accordance with other embodiments of the present invention, the spring-type mechanisms may instead be some other type of force-generating elements that do not use springs such as, for example, compressible and resilient polymers having effective spring constants.

The wire gripping device 500 further includes a first lever or idle arm 560 operationally connected to the roller 531. The wire gripping device 500 also includes a second lever or idle arm 570 operationally connected to the roller 541. The lever arms 560 and 570 may be pivotable, as shown in FIG. 5. The wire gripping device 500 includes an adjustment mechanism 580. The adjustment mechanism 580 is operationally connected between a distal end 511 of the first curved spring-type mechanism 510 and a distal end 521 of the second curved spring-type mechanism 520.

The first curved spring-type mechanism 510 is capable of applying a first force to the first lever arm 560 via a proximal end 512 of the first curved spring-type mechanism 510 to displace the roller 531 towards the roller 532. Similarly, the second curved spring-type mechanism 520 is capable of applying a second force to the second lever arm 570 via a proximal end 522 of the second curved spring-type mechanism 520 to displace the roller 541 towards the roller 542. That is, the forces produced by the curved spring-type mechanisms are transmitted to the rollers by way of the lever arms thereby producing the gripping or application forces. As an alternative, the wire gripping device 500 may include a cam between the proximal ends of the curved spring-type mechanisms and the lever arms such that the curved spring-type elements apply forces indirectly to the lever arms via the cams.

The curvature of the spring-type mechanisms 510 and 520 result in the adjustment mechanism 580 being positioned in an easily accessible location above the lever arms. Furthermore, the arrangement of the curved spring-type mechanisms 510 and 520 and the adjustment mechanism 580 allow for simultaneous adjustment of the forces applied to both lever arms 560 and 570 and, therefore, simultaneous adjustment of the gripping forces between each pair of rollers.

In accordance with an embodiment of the present invention, each curved spring-type mechanism 510 and 520 may include a compression spring (e.g., 513 and 515), having a spring constant, that is fitted over a curved rod-like guide element (e.g., 514 and 516). The rod-like guide element defines the curved path which the compression spring conforms to when fitted over the rod-like guide element. Alternatively, the curved rod-like guide element may be hollow and the compression spring may reside within the hollow interior. In accordance with certain other embodiments of the present invention, a curved spring-type mechanism may include two or more compression springs having different spring constants or spring rates, for example.

In accordance with an embodiment of the present invention, the adjustment mechanism 580 may include a threaded engagement between two components on both sides of the adjustment mechanism 580. Turning a single knob or nut of the adjustment mechanism 580 in a first rotational direction continuously increases the gripping force between both pairs of rollers (e.g., by compressing the springs 513 and 515). Turning the knob or nut in the opposite rotational direction continuously decreases the gripping force between both pairs of rollers (e.g., by de-compressing the springs 513 and 515). Other adjustment mechanisms using threaded or non-threaded engagement arrangements are possible as well. Such other adjustment mechanisms may provide continuous or discrete adjustment of the applied forces. As described later herein, the adjustment of the applied gripping forces may be linear, non-linear, piece-wise linear (one or more linear ranges), or some combination thereof, in accordance with various embodiments of the present invention. For example, a curved or curvable force-generating element (e.g., a spring-like mechanism) may have a linear spring constant, a non-linear spring constant, or two or more springs each having a different spring constant.

Figure 5B:
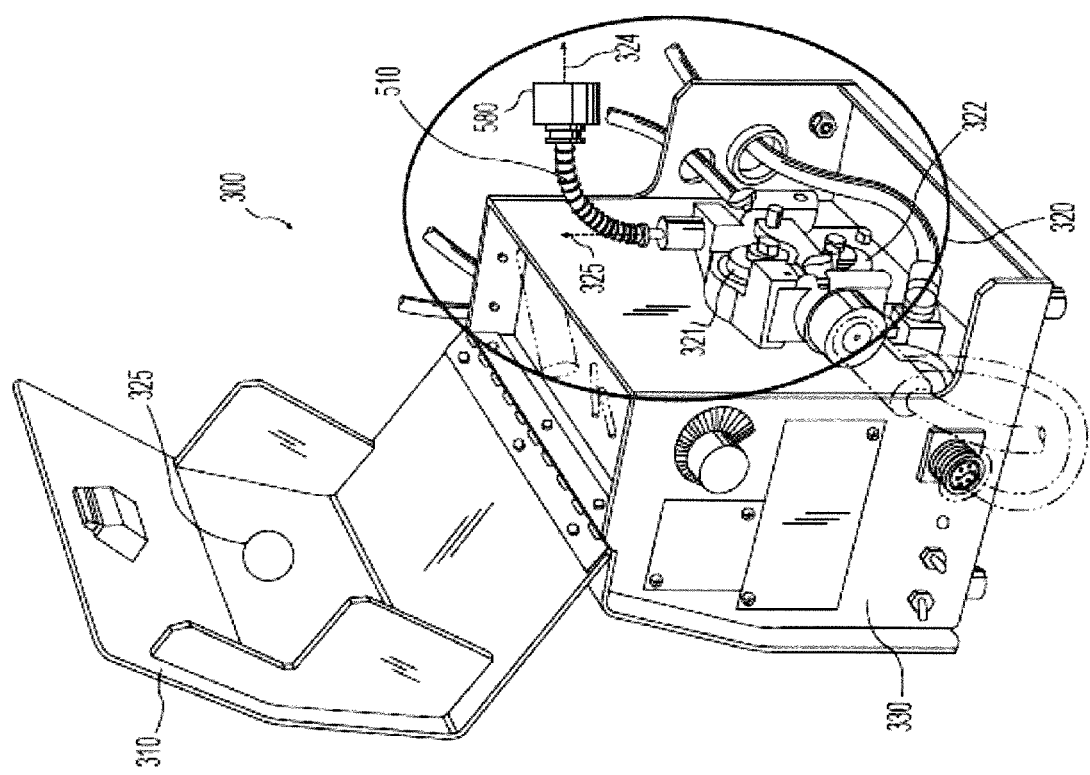
FIG. 5B illustrates an exemplary embodiment of a wire feeder having a single curved spring-type mechanism.

Similarly, in the wire gripping device 320 of FIG. 3, the straight or linear adjustable force generating mechanism 323 may be replaced with a single curved or curvable spring-type mechanism 510 and a corresponding adjustment mechanism 580, as shown in FIG. 5B such that a resultant location of the adjustment mechanism 580 allows for easier user access. For example, the spring-type mechanism 510 could be designed to curve outward along the direction 324 such that the adjustment mechanism 580 protrudes from an opening 325 in the cover 310 when the cover is closed. This would allow a user to make force adjustments without having to open the cover 310.

In accordance with other embodiments of the present invention, the curved spring-type mechanisms may be toolessly re-positionable. For example, in the case of the single pair of rollers 321 and 322 as in FIG. 5B, the curved spring-type mechanism 510 having an adjustment mechanism 580 toward its distal end could rotate about an imaginary vertical axis 325 passing through a proximal end of the curved spring-type mechanism 510, where force is applied to a lever arm. This would allow a user to position the corresponding adjustment mechanism 580 more toward the front of the wire feeder 300 or more toward the rear of the wire feeder 300, for example.

Figure 5C:
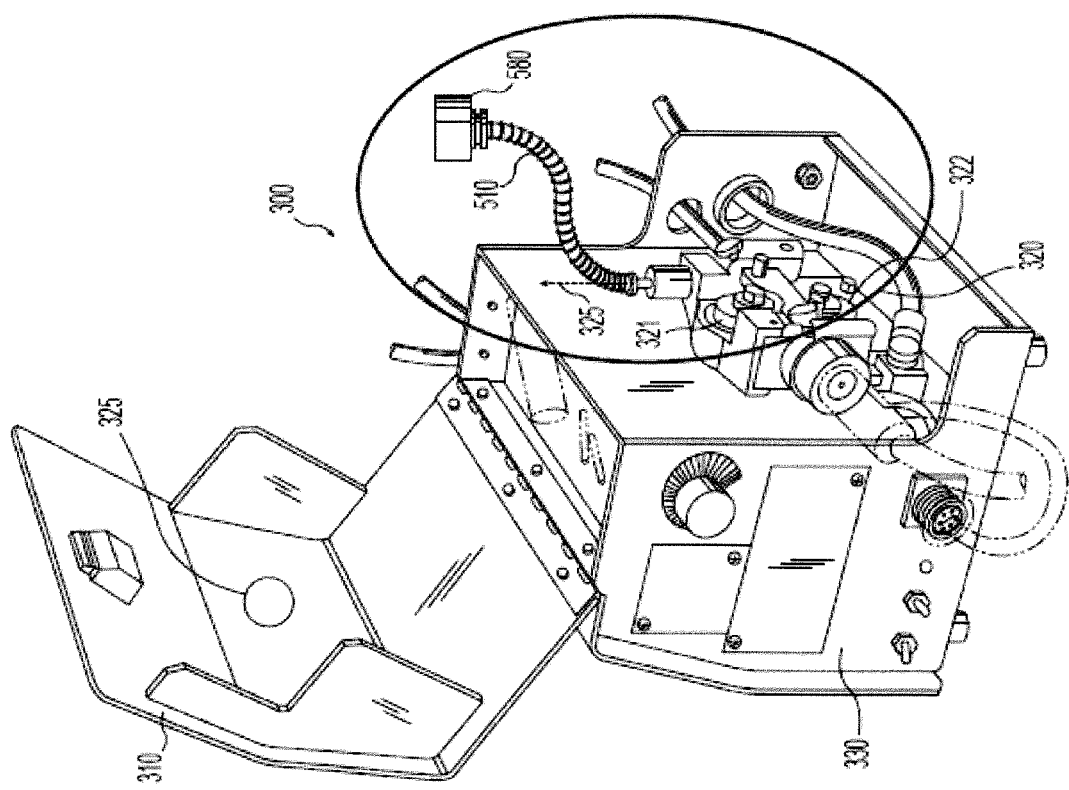
FIG. 5C illustrates an exemplary embodiment of a wire feeder having a single multi-curved spring-type mechanism.

In accordance with still other embodiments of the present invention, a curved spring-type mechanism 510 may be flexible (e.g., curvable), as shown in FIG. 5C, allowing different or multiple curvatures to be formed by the user. This would allow a user to bend the spring-type mechanism 510 to a desired shape to position the adjustment mechanism 580. The user may even be able to bend the spring-type mechanism from a curved shape to a generally straight or linear shape and vice versa, for example.

Figure 6:
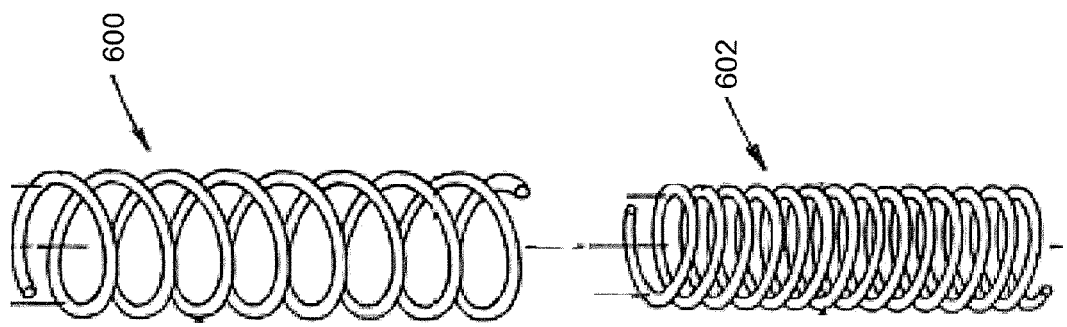
FIG. 6 illustrates an exploded view of a first exemplary embodiment of a portion of a spring-type mechanism that may be used in a wire feeder which includes two coaxial or nested springs.

FIG. 6 illustrates an exploded view of a first exemplary embodiment of a portion of a spring-type mechanism which includes two coaxial or nested cylinder springs 600 and 602 having, for example, different diameters and/or lengths. The cylinder springs 600 and 602 may be compression springs, wherein the first compression spring 600 has a first spring modulus (spring rate) and the second compression spring 602 has a second spring modulus (spring rate). It should be noted that, while compression springs are shown, other types of springs such as tension springs or leaf springs may be used without detracting from the scope of the claimed invention. The springs 600 and 602 appear in FIG. 6 as straight or linear springs for simplicity even though, when implemented in accordance with embodiments of the present invention, the springs 600 and 602 are curved or curvable.

The first and second spring modulus may be the same modulus or may be different from each other. Nonetheless, even if the spring moduli are the same, the overall spring modulus will be different depending on whether one or both springs are compressed for a particular setting of the adjustment mechanism, which is possible when the springs are of differing lengths, for example (e.g., see U.S. patent application Ser. No. 11/621,782 which is incorporated herein by reference). When two or more springs are used in a nested manner within a curved spring-type mechanism in accordance with an embodiment of the present invention, a spacer may be configured between the springs to prevent the springs from entangling with each other. The spacer may simply be a curved tube surrounding the lesser diameter spring, for example.

Figure 7:
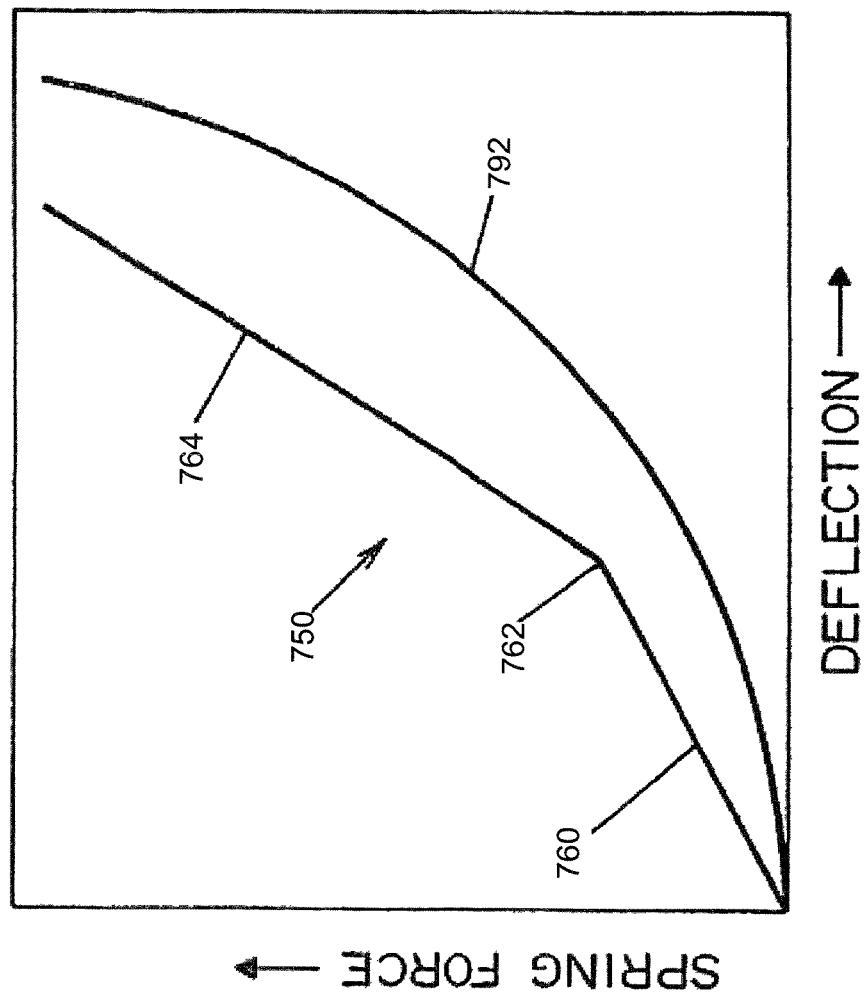
FIG. 7 is a schematic illustration showing overall spring force versus deflection.

FIG. 7 is a schematic illustration showing overall spring force versus deflection designated by the numeral 750 for the coaxial two-spring combination shown in FIG. 6. In this respect, when only the first spring 600 is compressed, the increase in overall spring force is shown by the segment 760 which is linearly increasing at a fixed rate in relation to the deflection of the spring. The linear increase is a function of the spring modulus of the spring 600. However, once the second spring 602 is engaged, which is shown as the point 762, the overall spring force will increase at a greater rate 764 for the same change in deflection. The linear increase in force in this range of deflection is a function of the spring modulus of the spring 600 and the spring modulus of the spring 602. As a result, the first spring 600 may be configured for the range of forces used for a softer wire and may allow for a more fine tuned adjustment for the softer wire. In the event that the user of the wire feeder chooses to change to a harder wire, the gripper may be quickly adjusted so that the second spring 602 is engaged thereby producing the second range of forces at a second level of adjustment for the harder wire.

Figure 8:
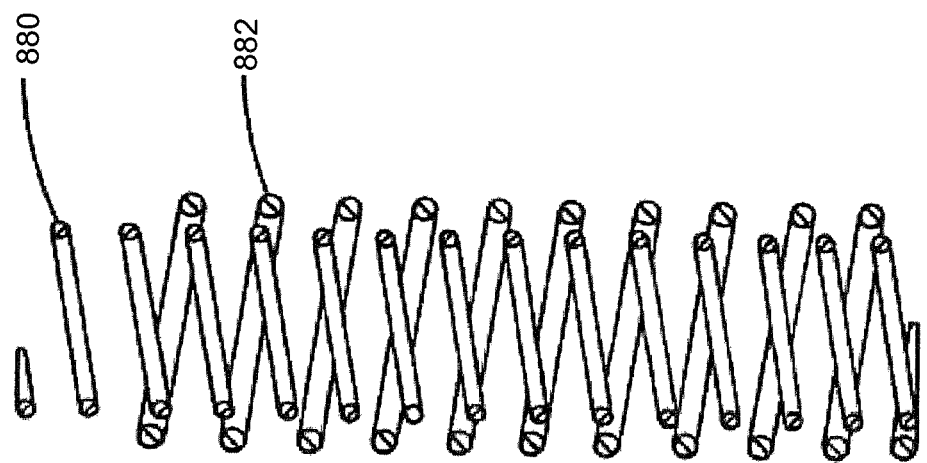
FIG. 8 illustrates a view of a second exemplary embodiment of a portion of a spring-type mechanism that may be used in a wire feeder which includes two coaxial or nested springs.

FIG. 8 illustrates a view of a second exemplary embodiment of a portion of the spring-type mechanism which includes two coaxial or nested springs. Springs 880 and 882 are shown wherein spring 880 is the first spring to engage while spring 882 is the secondary spring. Again, the springs 880 and 882 appear in FIG. 8 as straight or linear springs for simplicity even though, when implemented in accordance with embodiments of the present invention, the springs 880 and 882 are curved or curvable. In contrast to springs 600 and 602, the first spring to engage, spring 880, has a spring modulus that is less than the spring modulus of the second spring 882 to be engaged. This is at least in part because the spring 882 is made from a larger diameter spring wire. This spring arrangement provides different ranges of adjustment which are not closely spaced to one another as the spring arrangement shown with springs 600 and 602. While springs 600 and 602, and springs 880 and 882 are both shown to be nested springs, the springs could be stacked on top of one another. In a stacked spring arrangement, even though both springs would be engaged at essentially the same time, the spring with the smallest spring modulus would deflect first, thereby producing the first range of application forces between opposing rollers. Once the application force reaches a level great enough to deflect the larger modulus spring, the second spring would begin to deflect, thereby producing the second range of application forces.

Figure 9:
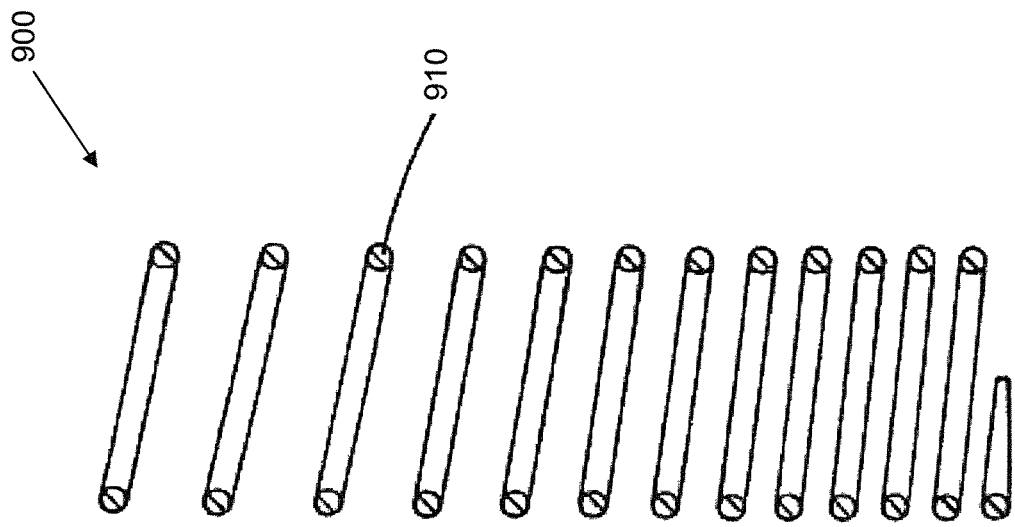
FIG. 9 illustrates a sectional view of an exemplary embodiment of a portion of a spring-type mechanism that may be used in a wire feeder including a single spring having more than one spring modulus.

FIG. 9 illustrates a sectional view of an exemplary embodiment of a portion of a spring-type mechanism including a single spring 900 having more than one spring modulus. As a result, a single spring may be used to produce multiple ranges of adjustment. In this respect, the spring modulus of a compression spring is a function of the material used to make the spring, the size of the material used, and the number of turns per unit of length measured. While spring 900 is shown to be a compression spring with a round spring wire 910 having a constant wire diameter throughout the spring, the number of turns per unit of length changes along the length of the spring. Spring 900 may be either a multiple modulus spring or a variable modulus spring depending on the spacing of the turns. Spring 900 is shown to be a variable rate spring. Again, the spring 900 appears in FIG. 9 as a straight or linear spring for simplicity even though, when implemented in accordance with embodiments of the present invention, the spring 900 is curved or curvable. Referring to FIG. 7, segment 792 shows the non-linear or variable rate nature of the spring 900. While spring 900 does not produce two clear and distinct adjustment ranges, it does allow for the fine tuned and precise adjustment used for the soft wires while still providing for the large application force used for the harder wires.

Figure 10:
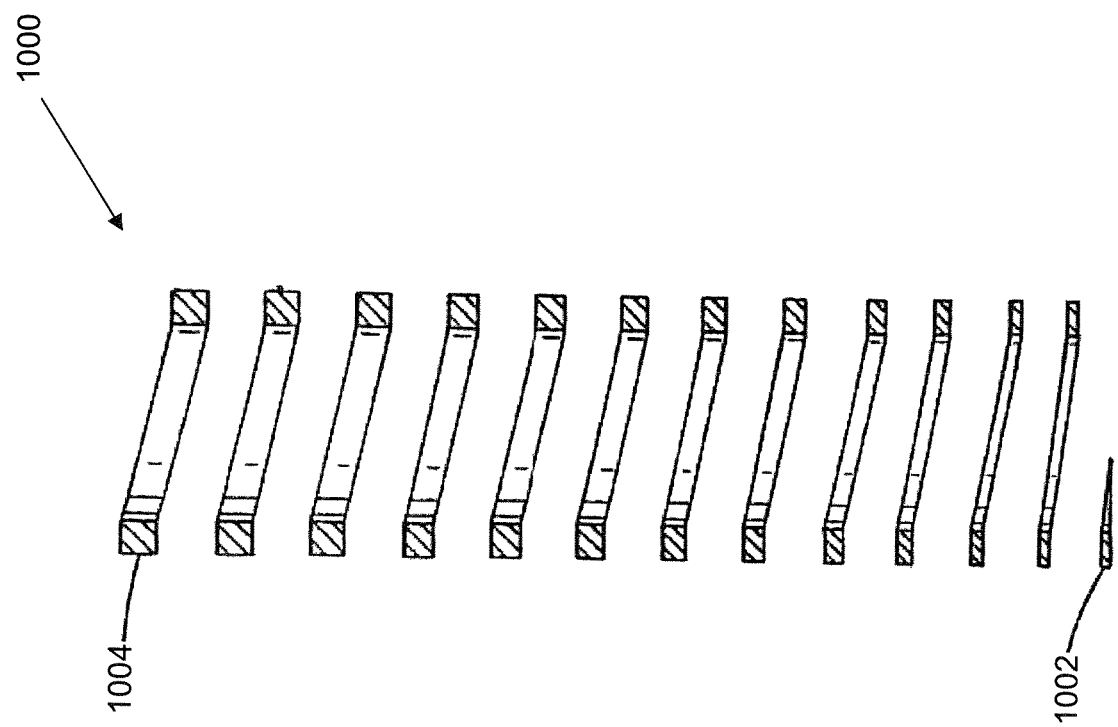
FIG. 10 illustrates a sectional view of an exemplary embodiment of a portion of the spring-type mechanism that may be used in a wire feeder including a variable rate spring.

FIG. 10 illustrates a sectional view of an exemplary embodiment of a portion of a spring-type mechanism including a variable rate spring 1000. The spring 1000 uses a change in material thickness to achieve the changing spring modulus for the spring. In this respect, the base 1002 of the spring 1000 has a rectangular cross-sectional configuration which is much smaller in area than a top 1004 which is square. As a result, as the spring 1000 is compressed, the turns toward the bottom of the spring will more easily compress than the turns at the top of the spring. This will produce the change in spring modulus as is shown by the segment 792 in FIG. 7. Again, the spring 1000 appears in FIG. 10 as a straight or linear spring for simplicity even though, when implemented in accordance with embodiments of the present invention, the spring 1000 is curved or curvable.

It should be appreciated that other combinations of springs may be used to achieve two or more ranges of adjustment for the application force without necessarily requiring modification of the wire feeder.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus for feeding a wire, said apparatus comprising:
    two pair of rotatable rollers;
    a first curved spring-type mechanism having a curved rod-like guide element and a spring conforming to the guide element and configured to apply a first force via a proximal end of said first curved spring-type mechanism to displace a first roller of a first pair of said rotatable rollers towards a second roller of said first pair of said rotatable rollers to engage a wire there between;
    a second curved spring-type mechanism having a curved rod-like guide element and a spring conforming to the guide element and configured to apply a second force via a proximal end of said second curved spring-type mechanism to displace a first roller of a second pair of said rotatable rollers towards a second roller of said second pair of said rotatable rollers to engage said wire there between;
    an adjustment mechanism operationally connected between a distal end of said first curved spring-type mechanism and a distal end of said second curved spring-type mechanism to allow simultaneous adjustment of said applied forces.

2. The apparatus of claim 1 wherein said spring in each of said curved spring-type mechanisms has a linear spring constant.

3. The apparatus of claim 1 wherein said spring in each of said curved spring-type mechanisms has a non-linear spring constant.

4. The apparatus of claim 1 wherein each of said curved spring-type mechanisms includes two or more springs each having a different spring constant.

5. The apparatus of claim 1 further comprising:
    a first lever arm operationally connected to said first roller of said first pair of said rotatable rollers, wherein said proximal end of said first curved spring-type mechanism is configured to apply said first force directly to said first lever arm; and
    a second lever arm operationally connected to said first roller of said second pair of said rotatable rollers, wherein said proximal end of said second curved spring-type mechanism is configured to apply said second force directly to said second lever arm.

6. The apparatus of claim 1 further comprising:
    a first lever arm operationally connected to said first roller of said first pair of said rotatable rollers, wherein said proximal end of said first curved spring-type mechanism is configured to apply said first force indirectly to said first lever arm; and
    a second lever arm operationally connected to said first roller of said second pair of said rotatable rollers, wherein said proximal end of said second curved spring-type mechanism is configured to apply said second force indirectly to said second lever arm.

7. The apparatus of claim 1 wherein said adjustment mechanism further includes one or more linear ranges of adjustable forces.

* * * * *